United States Patent
Born et al.

(10) Patent No.: US 11,063,537 B2
(45) Date of Patent: Jul. 13, 2021

(54) CONTROL METHOD OF A DIRECT CURRENT ELECTRIC MOTOR

(71) Applicant: The Swatch Group Research and Development Ltd, Marin (CH)

(72) Inventors: Jean-Jacques Born, Morges (CH); Christophe Germiquet, Prêles (CH); Laurent Nagy, Liebefeld (CH)

(73) Assignee: The Swatch Group Research and Development Ltd, Marin (CH)

( * ) Notice: Subject to any disclaimer, the term of this patent is extended or adjusted under 35 U.S.C. 154(b) by 26 days.

(21) Appl. No.: 16/656,848

(22) Filed: Oct. 18, 2019

(65) Prior Publication Data

US 2020/0186059 A1 Jun. 11, 2020

(30) Foreign Application Priority Data

Dec. 6, 2018 (EP) .................................... 18210868

(51) Int. Cl.
*H02P 6/14* (2016.01)
*H02K 21/24* (2006.01)
*H02P 6/06* (2006.01)

(52) U.S. Cl.
CPC ............. *H02P 6/14* (2013.01); *H02K 21/24* (2013.01); *H02P 6/06* (2013.01)

(58) Field of Classification Search
CPC .. H02P 6/06; H02P 6/14; H02K 29/12; H02K 21/24; G04C 3/16; H01R 39/46
See application file for complete search history.

(56) References Cited

U.S. PATENT DOCUMENTS

| | | | |
|---|---|---|---|
| 4,375,049 A * | 2/1983 | Grand Chavin | H02P 8/02 318/696 |
| 6,034,502 A | 3/2000 | Bühler | |
| 6,326,760 B1 * | 12/2001 | Cardoletti | H02P 6/14 318/374 |
| 2006/0186846 A1 | 8/2006 | Lassen | |
| 2008/0157707 A1 * | 7/2008 | Jeske | H02P 6/182 318/723 |
| 2015/0214876 A1 * | 7/2015 | Itoigawa | H02P 6/20 318/400.26 |

OTHER PUBLICATIONS

EPO search report in EP Application No. 18210868.8 dated May 29, 2019.

* cited by examiner

*Primary Examiner* — Said Bouziane
(74) *Attorney, Agent, or Firm* — Sughrue Mion, PLLC

(57) ABSTRACT

The present invention concerns a method of controlling a rotational speed of a rotor (3) of a direct current electric motor (1) comprising an inductor circuit (A, B) for rotating the rotor, which is configured to rotate continuously and is equipped with permanent magnets. The method comprises: measuring the rotational speed of the rotor; determining a time drift in the rotor rotation compared to a reference signal; defining N speed thresholds with at least one being a variable speed threshold depending on the determined time drift, the N speed thresholds defining N+1 rotational speed ranges for the rotor; determining in which one of the N+1 rotational speed ranges the determined rotational speed of the rotor is; and finally selecting an action relative to the control of the inductor circuit, based on the determined rotational speed range, for controlling the rotational speed of the rotor.

10 Claims, 4 Drawing Sheets

CONTROL METHOD OF A DIRECT CURRENT ELECTRIC MOTOR

CROSS REFERENCE

This application is based on and claims priority under 35 USC 119(e) from European Patent Application No. 18210868.8 filed Dec. 6, 2018, the contents of which are incorporated herein by reference in their entirety.

TECHNICAL FIELD

The present invention relates to a control method for a rotor of a direct current (DC) electric motor, such as a brushless DC electric motor. The proposed method is particularly suited for driving electric motors of small dimensions as used for instance in horological applications and more specifically in electromechanical watch movements.

BACKGROUND OF THE INVENTION

DC electric motors are well known and have been around for quite a long time. These motors convert electrical energy into mechanical energy for many types of applications. Electromechanical mobile devices, such as electromechanical wristwatches, often comprise a DC motor and are powered by DC sources, such as batteries. One example of a DC motor is a permanent magnet DC motor. This kind of DC motor has no brushes and has typically permanent magnets on the rotor. The stator comprises coils, which typically do not move. This kind of electric motor allows for smaller design and results in reduced power consumption.

In horological applications, stepper motors are generally used. Specific commands generate (voltage) pulses, which make the rotor advance step by step. Stepper motors are brushless DC motors, which divide a full rotation into a number of equal steps. The stator defines stable positions for the rotor equipped with permanent magnets. There are typically two or three stable positions per one full rotation of 360 degrees. The drive voltage pulses need a certain power and a sufficient voltage level. Voltage supplies used in these motors, especially when used in electromechanical watches, typically generate a voltage value between 1.2 V and 1.5 V. Consequently, batteries available for these applications supply a voltage in this range of values. However, continuous rotation DC electric motors have the advantage over stepper motors that when used in horological applications, the watch hands can be rotated continuously. This makes the operation of these watches similar to mechanical watches. In this manner noise caused by the steps of the rotor, which could be disturbing in particular at night time, can be avoided.

A DC motor is controlled by a motor drive unit. The drive units are typically arranged to alternate the current that travels in the stator coils and thus the direction of the magnetic flux lines which are coupled to the magnet(s) of the rotor. An H-bridge circuit is an example of a motor drive unit. The term H-bridge is derived from the typical graphical representation of this kind of circuit comprising four switches arranged between a supply voltage node and ground. By opening and closing these switches in a desired manner, a positive or negative voltage can be selectively applied across the motor inductor circuit. In other words, by manipulating the four switches depending on the position of the rotor or more specifically on the rotor magnets, a current can be arranged to travel through the stator coils selectively in a first direction and in a second, opposite direction.

A control unit, which may be part of the motor drive unit or provided separately, is arranged to control the operation of the motor drive unit. In horological applications, the average or mean "number of turns of the rotor per time unit" must be controlled so that, in the end, the time display remains correct. A problem occurs with a simple control method where a drive voltage pulse of fixed duration is applied each time a certain delay has been detected. Indeed, the rotor speed varies a lot, periodically with a speed peak followed by a slowdown where the speed decreases to a relatively low speed. Thus, a speed instability occurs which is not favourable for an analog display of a watch. Furthermore, such a situation can result periodically in too low speed with the consequence that the motor can be easily stopped or its rotation direction changed for instance by small shocks, i.e. by small accelerations that the watch can undergo.

SUMMARY OF THE INVENTION

An object of the present invention is to control the rotation of the rotor of DC motors by allowing a smooth variation of the speed while controlling the average number of rotations or turns of the rotor per time unit, and to do so without having a too complex and high energy consuming control unit.

According to a first aspect of the invention, there is provided a control method of an electrical DC motor comprising a rotor and an inductor circuit for driving this rotor, which is configured to rotate continuously and is equipped with permanent magnets. The method comprises the following steps:
  from a start time point, measuring a time drift in the rotor rotation by comparing a detected number of rotation cycles of the rotor with a reference number of nominal rotation cycles for the rotor corresponding to a nominal rotational speed, the nominal rotation cycles being determined by a reference clock signal;
  defining N speed threshold(s) with N being greater than zero, at least one of the speed threshold(s) being a variable speed threshold depending on the measured time drift in the rotor rotation, the N speed threshold(s) defining N+1 rotational speed ranges for the rotor;
the method further comprising a periodic sequence of the following steps:
  measuring a time parameter of the direct current electric motor, the value of which is determined by the rotational speed of the rotor;
  adjusting the at least one variable speed threshold in function of the current value of the time drift;
  based on the measured time parameter, determining in which one of the N+1 rotational speed ranges the rotational speed of the rotor is; and
  selecting an action among a group of different defined actions relative to the control of an electrical current through the inductor circuit, based on the determined rotational speed range in which the rotational speed of the rotor is, to control the rotational speed of the rotor.

According to a particular variant wherein N is greater than one, at least one of the N speed thresholds is a fixed threshold.

According to a preferred variant, the group of different defined actions comprises the following possible actions: applying one or more energy pulses across at least a portion of the inductor circuit; no drive action and terminating the sequence; and short-circuiting at least a portion of the inductor circuit.

In a preferred embodiment wherein there are a plurality of variable speed thresholds, these variable speed thresholds are adjusted so that, if the rotor rotation is determined to have at least a given time advance, then the variable speed thresholds are selected such as to allow slowing down the rotational speed of the rotor. But if the rotor rotation is determined to have a substantially zero cumulative time difference or a predefined small advance, then the variable speed thresholds are selected such as to allow substantially maintaining the current rotational speed of the rotor. Finally, if the rotor rotation is determined to have at least a given time delay, then the variable speed thresholds are selected such as to allow accelerating the rotational speed of the rotor. However, it is to be noted that the control of an electrical current through the inductor circuit to control the rotational speed of the rotor also depends on the instantaneous rotational speed of the rotor, which is detected in each sequence of the periodic sequences of the control method.

The proposed solution has the advantage that the proposed method is very efficient, minimising the power consumption as no complicated computation is needed. The proposed method is precise and also very flexible, if so required, because it is easy to add decision making thresholds.

BRIEF DESCRIPTION OF THE DRAWINGS

Other features and advantages of the invention will become apparent from the following description of a non-limiting example embodiment, with reference to the appended drawings, in which.

DETAILED DESCRIPTION OF THE INVENTION

Figure 1:
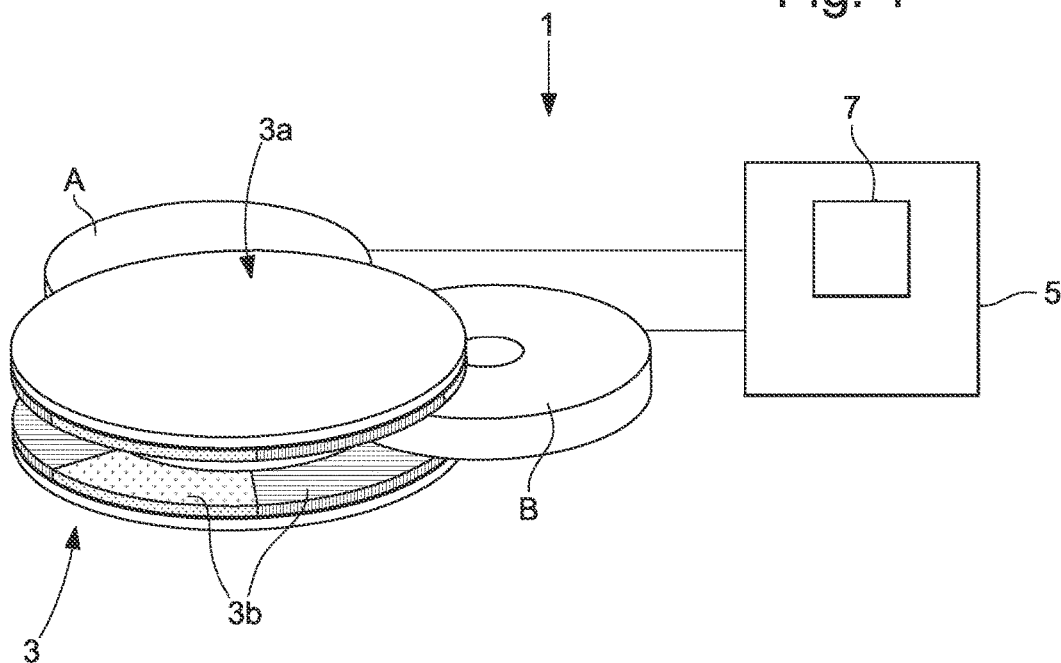
FIG. 1 illustrates in a simplified and schematic manner a DC electric motor where the teachings of the present invention may be applied.

An embodiment of the present invention will now be described in detail with reference to the attached figures. The invention will be described in the context of a speed control method and more specifically a mean speed control method of a rotor of a continuous rotation DC electric motor of a watch, such as a wristwatch, where the rotor of the motor is equipped with bipolar permanent magnets (these magnets having an axial polarisation and alternate polarities). However, the teachings of the invention are not limited to this environment or application. Identical or corresponding functional and structural elements which appear in different drawings are assigned the same reference numerals. As utilised herein, "and/or" means any one or more of the items in the list joined by "and/or". The word "comprise" is interpreted by the broader meaning "include" or "contain".

FIG. 1 illustrates schematically and in a simplified manner a DC electric motor 1, where the invention may be applied. The motor 1 as shown of FIG. 1 comprises a rotor 3, with permanent bipolar magnets 3b regularly arranged on two ferromagnetic discs 3a, and a stator formed by a first inductor A and a second inductor B. In a normal functioning mode, the rotor is arranged to continuously rotate in a first direction but optionally also in a second, opposite direction. Measured from the axis of rotation of the rotor 3 and from the centres of the first and second stator inductors A, B, the first and second inductors A, B are at an angle $\alpha$ relative to each other. In the present example, the angle $\alpha$ is preferably 104° but in an advantageous variant it could be any value between 95° and 115°. A motor drive unit 5 is configured to control the current through the inductors or coils and thereby to drive the rotor 3. A digital control unit or circuit or simply a controller 7 is in turn configured to control the operation of the motor drive unit based on the detected operation of the rotor. For instance, if the control unit 7 detects that the rotor is spinning too slowly, it can order the motor drive unit 5 to accelerate the rotor 3 as explained later in more detail. It is to be noted that in the present example, the motor drive unit 5 (including the control unit 7) is considered to be part of the motor but it could instead be considered not to be part of it.

Figure 2:
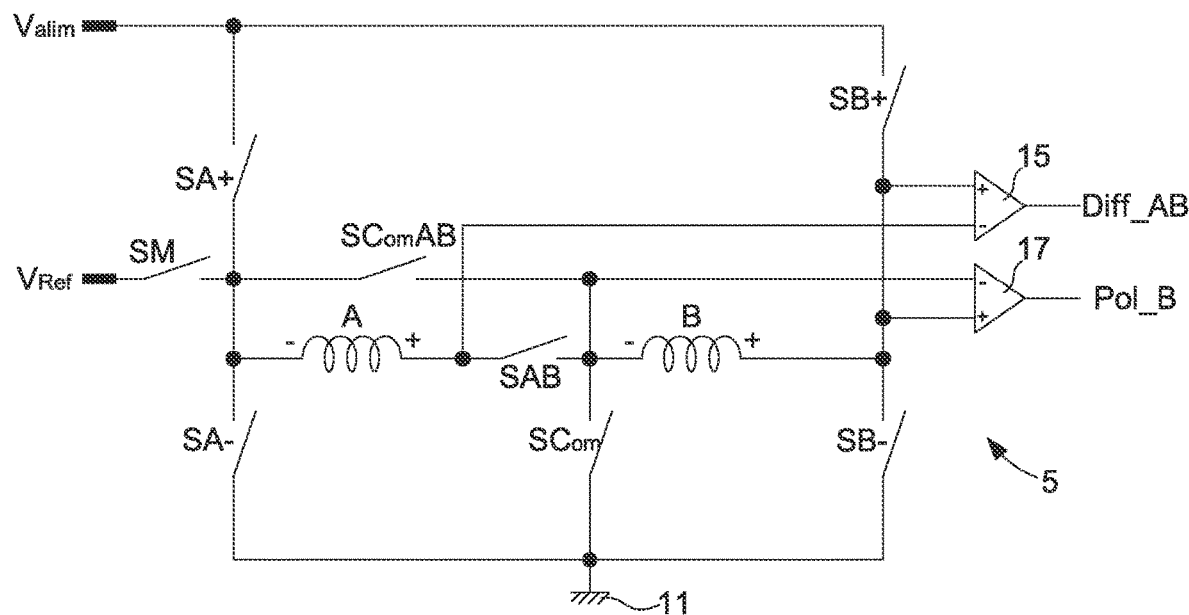
FIG. 2 is a simplified circuit diagram illustrating a motor drive circuit of the motor of FIG. 1.

FIG. 2 illustrates in a simplified manner an electrical circuit of the motor drive unit 5 where the teachings of the present invention may be applied. However, the present invention is by no means limited to this specific circuit configuration. The circuit of FIG. 2 however omits the digital control unit 7, the operation of which is explained later in more detail. The circuit of FIG. 2 receives a supply voltage $V_{alim}$ that comes from a supply voltage source, such as a battery, which provides a battery voltage Vbat. The supply voltage $V_{alim}$ may be selected to be smaller than the battery voltage. Then, this supply voltage $V_{alim}$ may vary depending on specific phases of the control method. The electrical circuit also comprises a switch circuit between the node of the supply voltage $V_{alim}$ and a reference voltage node 11, which is at a constant electric potential. In the example shown in FIG. 2, the reference voltage node 11 is grounded (i.e. at zero potential). The switch circuit includes fourth switches SA+, SA−, SB+ and SB− which form a traditional H-bridge. Other switches SComAB, SAB and SCom are used for instance to start up the motor and to monitor the rotor operation. For this monitoring, an intermediate reference voltage $V_{Ref}$ and a switch SM, arranged between the node of the intermediate reference voltage $V_{Ref}$ and the H-bridge, are provided. The motor drive circuit in this example also comprises two inductors or coils, namely the first inductor A and the second inductor B, together forming a stator inductor circuit (as shown in FIG. 1). The two inductors A, B are arranged in series with the switch SAB arranged between them. However, the inductors could instead be arranged in parallel or could be arranged in parallel in specific situations, in particular during control phases where an important torque is needed. Furthermore, the teachings of the invention are not limited to configurations having two inductors. In other words, configurations having more than two inductors, such as three inductors, are equally possible.

In this example, the switches are transistors, such as n-type metal-oxide-semiconductor field effect transistors (MOSFETs). The operation of the switches is controlled by the digital control unit 7. More specifically, the digital control unit is configured to control the switches to be either closed or open. In the present description, when a switch is said to be closed, then the path between the source and drain nodes of the corresponding transistor is electrically conductive, whereas when a switch is said to be open, then this path is not electrically conductive. The digital control unit is also arranged to monitor various parameters of the motor, such as the rotational speed of the rotor 3, and more specifically the instantaneous rotational speed. The control unit can also determine the direction of the rotation of the rotor 3 as well as to determine if the rotor has some advance or delay with respect to a given reference (time) signal.

The motor drive circuit of FIG. 2 also comprises a measurement circuit formed by a comparator set comprising a first comparator 15 and a second comparator 17. Each of the two comparators has an analogue negative input terminal, an analogue positive input terminal and one binary output terminal. The negative input terminal of the first comparator is connected to a first terminal of the first inductor A, while the positive input terminal of the first comparator 15 is connected to a first terminal of the second inductor B. The negative input terminal of the second comparator is connected to a second terminal of the second inductor B and through the switches SComAB and SM to the intermediate reference voltage node $V_{Ref}$. The positive input terminal of the second comparator 17 is connected to the first terminal of the second inductor B. It is to be noted that all the comparator input signals are analogue voltage values. Preferably, the intermediate voltage $V_{Ref}$ is selected so as to have a value approximately equal to half the difference between the supply voltage $V_{alim}$ and the reference voltage at node 11. The first and second comparators are used to measure certain parameters in the circuit as explained later in more detail. The output nodes are in this example connected to the control unit 7.

Figure 3:
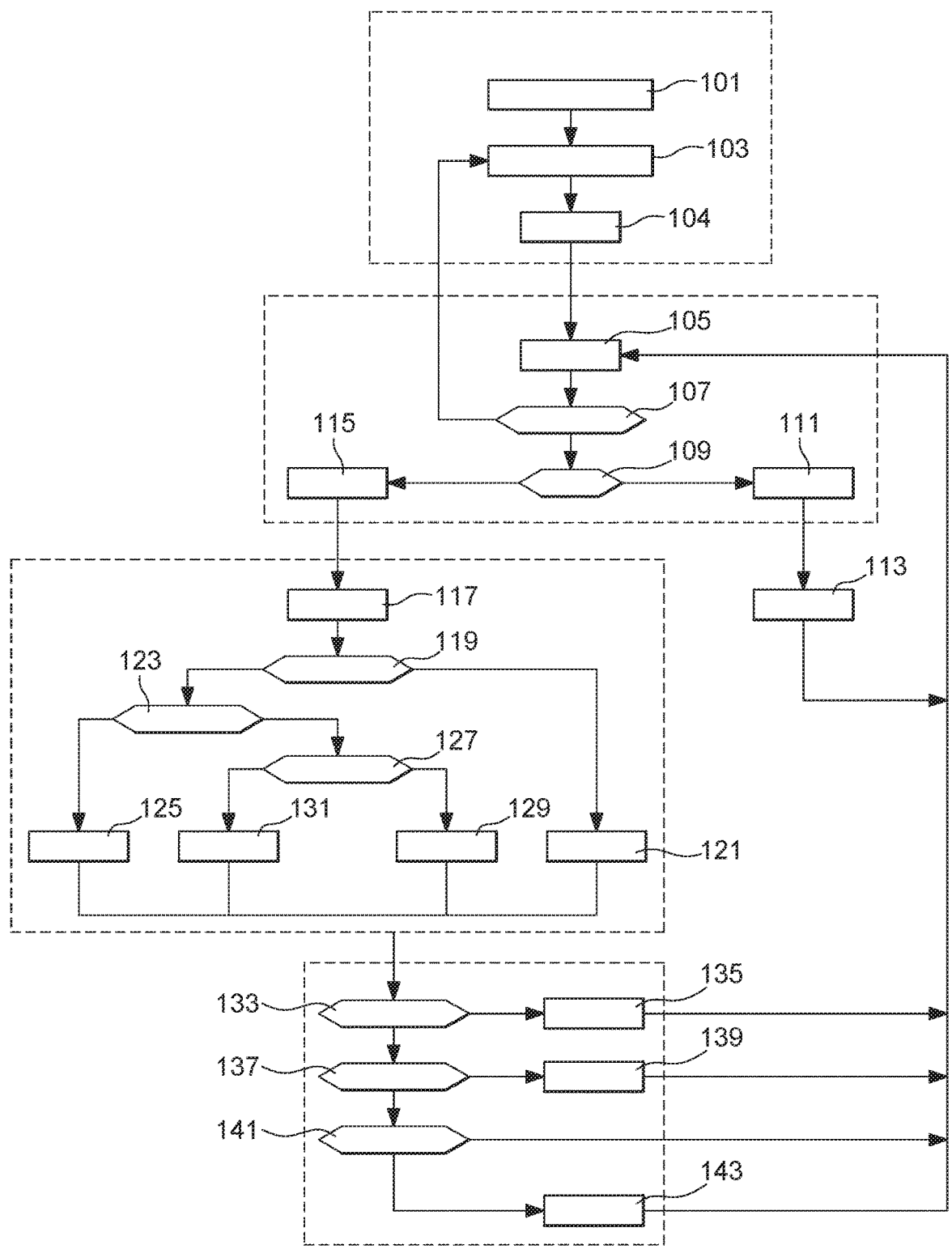
FIG. 3 is a flow chart illustrating the proposed speed control method according to an example embodiment of the present invention.
Figure 4:
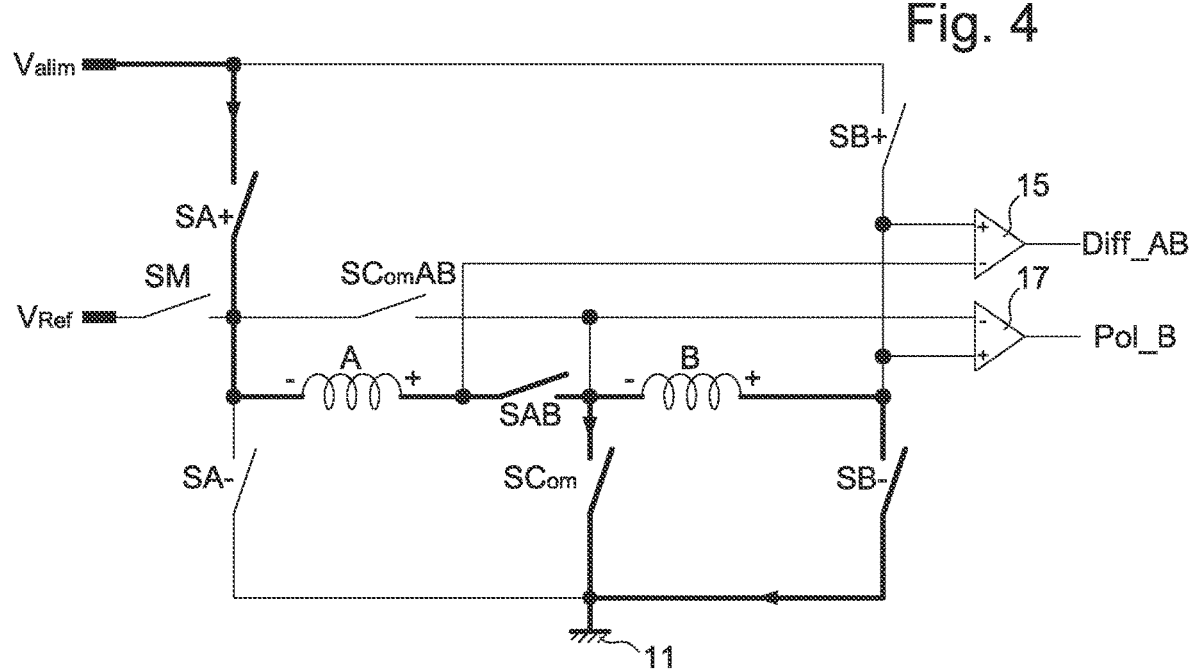
FIG. 4 shows the circuit of FIG. 2 and further illustrates how the current flows in the circuit during a first start-up phase.

The proposed rotor speed control or adjustment method is next explained in more detail with reference to the flow chart of FIG. 3. The method may be divided into four distinct phases (shown by the dashed boxes in FIG. 3), namely a start-up phase, a measurement phase (also named a peak detection phase when the two induced voltages in the two coils have a same amplitude), a speed threshold setting phase and a speed control phase. The start-up phase generally begins after a power-up of the motor drive circuit and comprises three start-up steps. In step 101, an advance/delay bidirectional counter C (also simply named 'counter C' in the following of this description) is launched. Then, a first start-up phase or step 103 with a first time duration followed by a second start-up phase or step 104 with a second time duration. The first time duration is typically much longer than the second time duration. The first start-up phase involves centring a magnet pair of the rotor at the first inductor A (or at the second inductor B), i.e. to align two bipolar permanent magnets, axially arranged respectively on both ferromagnetic discs (see FIG. 1), with the first coil A. This is carried out by closing the switches SA+, SAB and SCom. By short-circuiting the second inductor B by closing the switch SB−, a rotor oscillation can be damped. The duration of the first start-up phase is in this example 700 ms. FIG. 4 illustrates how the current is arranged to flow in the circuit during the first start-up phase (switches represented by a bold line are closed, the others being open).

Figure 5:
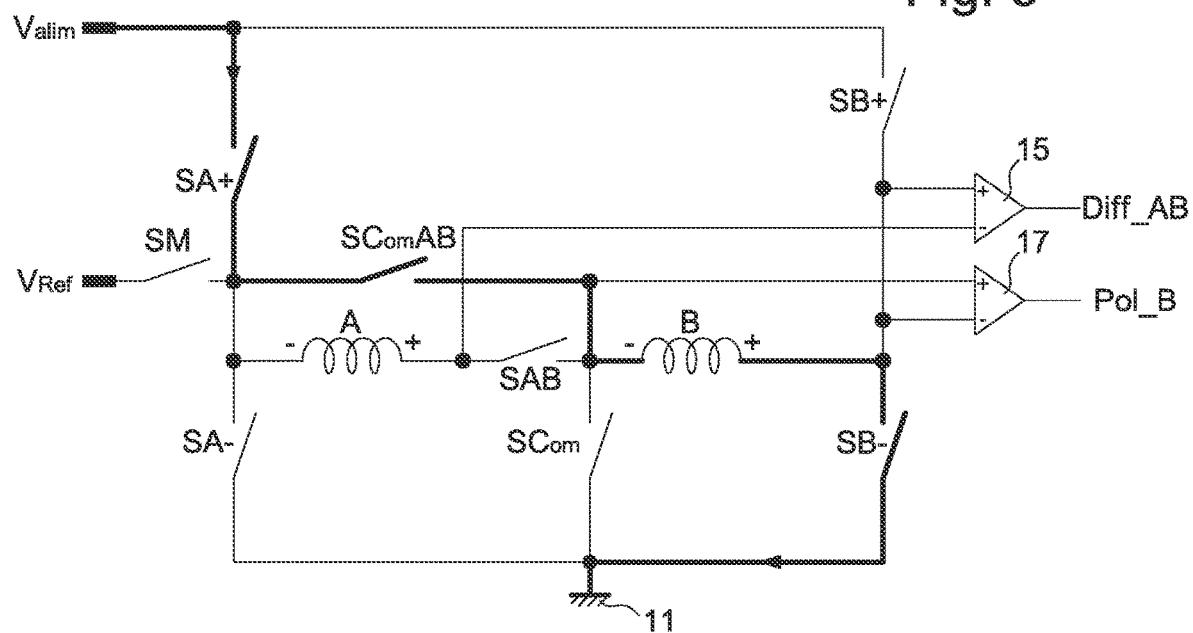
FIG. 5 shows the circuit of FIG. 2 and further illustrates how the current flows in the circuit during a second start-up phase.

During the second start-up phase in step 104 no current flows through the first inductor A because the switches SAB and SCom are open. During this phase, the voltage supply node is connected directly to the second inductor B by closing the switch SComAB (the switch SB− remaining closed). The duration of the second start-up phase is in this example 30 ms. FIG. 5 illustrates how the current is arranged to flow in the circuit during the second start-up phase. During this phase the second inductor B, which is supplied now by the supply voltage $V_{alim}$, attracts a magnet pair presenting an offset, with respect to the second inductor, after the first start-up phase. In this manner the rotor 3 is accelerated to achieve a speed close to its nominal (i.e. desired or target) speed (e.g. approximately 75% of the nominal speed).

The counter C is incremented by a given value, which in this example is 1, once every nominal half-period of the induced voltage in each coil A, B, this nominal half-period being obtained from/determined by a reference clock signal. In the described example, the nominal half-period is about 20.8 ms. For the electric motor represented in FIG. 1, this nominal half-period has a value equal to the inverse of the nominal rotational speed of the rotor (in this example, equal to eight turns per second=8 Hz) divided by six, i.e. a value equal to the duration of one nominal cycle/one turn of the rotor rotation at the nominal rotational speed divided by the number of bipolar magnets, with alternate axial polarisation, on each ferromagnetic disc of the rotor.

Figure 7:
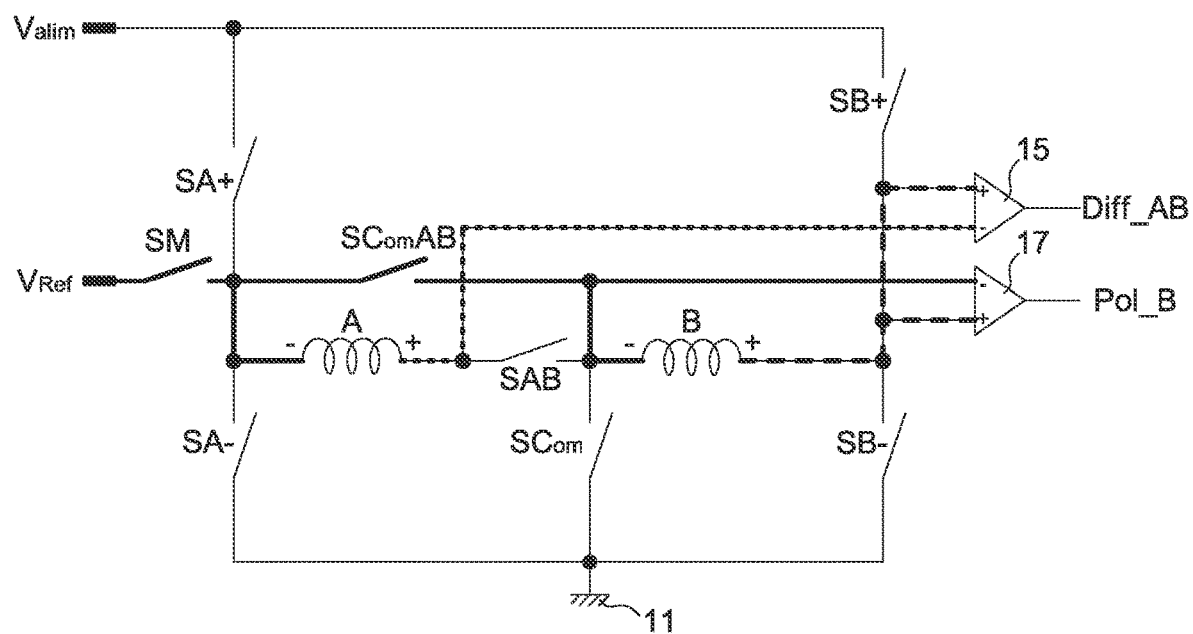
FIG. 7 shows the circuit of FIG. 2 and further illustrates how the electrical circuit is connected during a measurement phase.

A measurement phase is explained next. FIG. 7 illustrates how the circuit is connected during each measurement phase. The switches SM and SComAB are closed while the other switches are open. By 'induced voltage in/of a coil or across an inductor circuit' it is understood the induced voltage (caused by the rotation of the rotor) between the two terminals of the coil or of the inductor circuit.

Figure 6A:
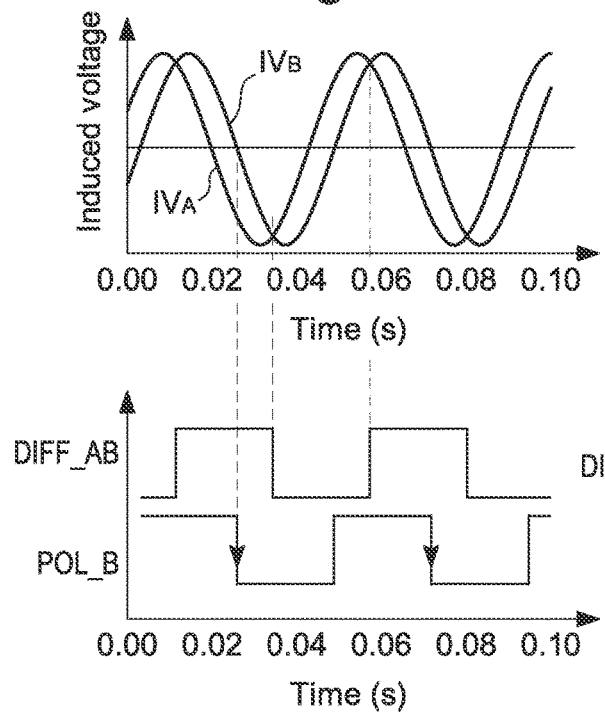
FIGS. 6a and 6b show signal diagrams illustrating values of induced voltages across inductors of the circuit of FIG. 2 during the measurement phase and comparator outputs of the circuit of FIG. 2.
Figure 6B:
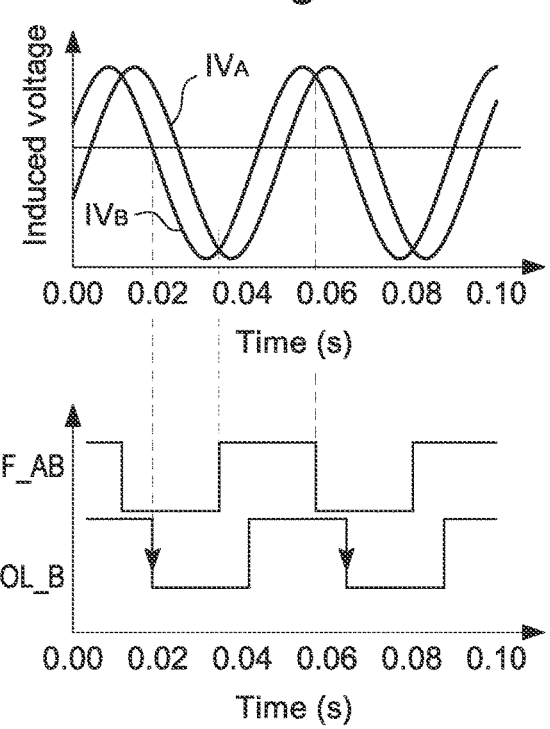

The first comparator 15 is used to track the time points where the induced voltages $VI_A$ and $VI_B$ (caused by the rotation or turning of the rotor) of the first and second inductors A, B cross. In other words, in this example, when the rotor rotates in the correct direction (i.e. clockwise), the output signal of the first comparator equals '0' if $VI_A > VI_B$, otherwise the output equals '1'. The digital output signal of the first comparator indicates the mathematical sign of a difference signal between the induced voltages in the first and second inductors A, B and is abbreviated as Diff_AB. Thus, transitions in the digital output signal correspond to crossings of the two induced voltages $VI_A$ and $VI_B$. FIG. 6a shows the induced voltage waveforms and the output signals of the first and second comparators 15, 17 when the rotor spins clockwise while FIG. 6b shows the induced voltage waveforms and the output signals of the first and second comparators 15, 17 when the rotor spins counter-clockwise. It is to be noted that, when the rotor spins clockwise, the rotor magnets face first the first inductor A before facing the second inductor B.

The second comparator 17 is used to track the mathematical sign of the voltage induced in the second inductor B. The output of the second comparator equals '1' if the sign of the induced voltage is positive, otherwise the output of the second comparator equals '0'. The output signal of the second comparator thus corresponds to a polarity signal of the voltage induced in the second inductor B and is abbreviated as Pol_B. The signal Pol_B is used together with the signal Diff_AB to determine the direction of the rotation of the motor while the signal Diff_AB is used to detect the crossing of the induced voltages. In a preferred embodiment, the signal Diff_AB is used to trigger drive voltage pulses to drive the rotor 3. The direction of rotation of the rotor may be determined for instance by determining the sign of the signal Diff_AB when the value of the signal Pol_B changes from the logical state '1' to the logical state '0' (for example, when the rotor spins clockwise, the signal Diff_AB is equal to '1' when a transition from '1' to '0' occurs in the signal Pol_B. However, if such an event occurs when the rotor spins counter-clockwise, the signal Diff_AB is equal to '0').

The process thus continues in step 105 where the rotational speed of the rotor 3 is determined and more specifically the instantaneous rotational speed. In this example, the instantaneous rotational speed is determined by detecting the time elapsed, referred to as dtPeak, between two successive voltage crossings, i.e. the crossings of the two induced voltages respectively in the first and second inductors A, B. In step 105, each voltage crossing of the two induced voltages is detected and a sequence of the control method is started after each voltage crossing detection. Thus, following each voltage crossing, i.e. after each detection of a transition in the signal DIFF_AB, a new sequence of the control method is launched. In each sequence, the instantaneous rotational speed of the rotor is determined through a corresponding time parameter dtPeak, which is measured by the drive unit 5 based on the detection of two successive transitions in the signal DIFF_AB provided by the comparator 15 during measurement phases, i.e. the last detected transition, which starts the considered sequence, and the preceding transition. Then, in step 107, dtPeak is compared to a given value (threshold), which in this example is a fixed value, such as 200 ms. It is to be noted that in this specific example the nominal rotational speed of the rotor is 8 Hz (eight turns per second), which means that the nominal time distance between two consecutive induced voltage crossings is about 20.8 ms (considering that the rotor comprises three magnet pairs with alternate polarities on each of the two ferromagnetic discs of the rotor, as shown on FIG. 1, and there are two voltage crossings per period of the induced voltage, this period being equal to the duration of a cycle/a turn of the rotor rotation divided by the number of magnet pairs on each ferromagnetic disc). If it is determined that dtPeak is greater than the given value, then the process returns to step 103. In other words, in this case it is determined that the rotor is not spinning properly or is simply spinning far too slowly. If it is determined that dtPeak equals the given value or is smaller than it, then in step 109 it is determined whether or not the rotor spins in the correct direction, i.e. in this example clockwise, as explained before.

If the rotor spins in the wrong direction, then in step 111 the advance/delay counter C is incremented by 1. It is to be noted that the higher the value of the counter C is, the more the rotor has time delay. Conversely, the smaller the current value (negative value) of the counter is, the more the rotor has time advance. Once the counter C has been updated, then in step 113, the inductor circuit is short-circuited for a third time duration, i.e. in the configuration of FIG. 2, the switches SA+, SComAB, SAB and SB+ are closed while the other switches are opened. In this manner, the rotor rapidly slows down. The third time duration may be between 5 ms and 15 ms. In this example the third time duration is 10 ms. The process then returns to step 105. On the other hand, if in step 109 it was determined that the rotor spins in the correct direction, then in step 115, the counter C is decremented by 1. Thus, the value Cv of the counter C corresponds to a time drift in the rotor rotation from a start time point compared to a nominal rotor rotation. From the start time point, the time drift in the rotor rotation is measured by comparing a detected number of rotation cycles of the rotor with a reference number of nominal rotation cycles of the rotor corresponding to a nominal rotational speed. The nominal rotation cycles are determined by a reference clock signal. Thus, in the described variant, when the rotor is rotating at its nominal speed, the bidirectional counter C is incremented by six every nominal rotation cycle through a digital reference signal obtained from the reference clock signal, but is also decremented by six during this nominal speed cycle in step 115. This means that in this case, the advance/delay counter C has a value Cv which remains constant. The value of the counter C may take any positive or negative integer (including zero). The steps 105 to 115 form the measurement phase of each sequence of the speed control method/process. The process next advances to the speed thresholds setting phase.

In step 117, the counter C is read. In step 119, the current value Cv of the counter C is compared to a first counter threshold, which in this example is set to −2. More specifically, in step 119 it is determined whether or not Cv is smaller than −2 (i.e. Cv<−2 ?) corresponding in this example to an advance of about 40 ms. In the affirmative, the process continues in step 121. In this step, a first or lower speed threshold dt_T1 and a second or upper speed threshold dt_T2 are adjusted. It is to be noted that the expression 'speed threshold' is used, in the description of the invention, to define a threshold for the selected time parameter, which corresponds to the rotor speed. In this specific example the first speed threshold dt_T1 is set to 27 ms, while the second speed threshold dt_T2 is set to 31 ms. It is to be noted that the first and second speed thresholds are both variable thresholds and they depend on the advance/delay of the rotor as will become clear. In this scenario, the rotor is determined to have some advance and accordingly both the first and second speed thresholds dt_T1 and dt_T2 are selected to be higher than the nominal half-period of the induced voltage in each coil, which is equal to 20.8 ms, as already mentioned before.

If in step 119, it was determined that the current counter value Cv is equal to or greater than −2 (i.e. Cv≥−2?), then in step 123 it is determined whether or not Cv is greater than a second counter threshold, which in this example is set to zero. In other words, in this step it is determined whether or not Cv>0. If this is not the case, then in step 125 the first and second speed thresholds are adjusted accordingly. In this specific example dt_T1 is set to be 23 ms, while dt_T2 is set to be 27 ms. Thus, in this scenario the rotor is detected not to have any delay or significant advance. Accordingly, in this example, the first threshold dt_T1 is selected to be slightly higher than the nominal half-period of the induced voltage, while the second threshold dt_T2 is selected to be about 30% higher than this nominal half-period.

If in step 123, it was determined that the Cv is greater than 0, then in step 127 Cv is compared to a third counter threshold, which in this example is set to ten. More specifically, in step 127 it is determined whether or not Cv is greater than the third counter threshold (i.e. Cv>10 ?). If this is the case, then in step 129, the first and second speed thresholds are adjusted accordingly. Since in this scenario, the rotor has lots of delay (in this example more than 200 ms), the first speed threshold is selected to be smaller than the nominal half-period of the induced voltage. More precisely, in this example, the first speed threshold is set to 16 ms, to be able to quickly accelerate the rotor to catch up the delay as will be explained later. The second speed threshold is set to 21 ms, which approximately corresponds to the nominal half-period of the induced voltage.

If in step 127 it was determined that the condition is not fulfilled, in other words if 0<Cv≤10, then in step 131, the first and second speed thresholds are adjusted based on the detected delay of the rotor. In this scenario, the rotor has a slight delay, thus the first speed threshold dt_T1 is selected to be smaller than the nominal half-period of the induced voltage, while the second speed threshold dt_T2 is selected to be greater than this nominal half-period of the induced voltage. In this specific example, the first speed threshold is set to 16 ms, while the second speed threshold is set to 27 ms. It is to be noted that in all of the above situations, the first and second speed thresholds are adjusted based on the detected advance or delay of the rotor (current time drift). The exact values of the speed thresholds are selected based on experimental results, but instead, a specific algorithm could be used to define these thresholds. As will be explained next, the first and second speed thresholds determine for each specific situation above described three ranges for the average rotational speed of the rotor. The process now advances to the speed control phase as outlined next.

Once the first and second speed thresholds have been selected as explained above, the process continues in step 133, where it is determined whether or not the following condition is fulfilled: dt_Peak>dt_T2 In other words, in this step the rotational speed of the rotor is compared to the second speed threshold to detect if the rotational speed of the rotor is in a first range above the second speed threshold. In the affirmative, it can be determined that the rotor 3 spins far too slowly and in step 135 a high energy pulse is injected into the inductor circuit to accelerate the rotor 3. The high energy pulse in this example corresponds to a high voltage value (e.g. 1.5 V) being applied across the inductor circuit for a fourth time duration, which in this example is between 10 ms and 15 ms. More specifically, the high energy pulse is achieved by connecting the voltage supply to the inductor circuit, which is momentarily put in a configuration wherein the two coils A & B are arranged in series. Such a configuration corresponds to a situation in which, during a positive high energy pulse, the switches SB+, SAB and SA− are closed and the others are opened, while during a negative high energy pulse, the switches SA+, SAB and SB− are closed and the others are opened. Then, the sequence is terminated and the process then continues in step 105.

If in step 133 it was determined that the condition is not fulfilled, i.e. dt_Peak≤dt_T2, then in step 137 it is determined whether or not the following condition is fulfilled: dt_Peak>dt_T1 In the affirmative, the rotational speed of the rotor is in a second range and, in step 139, a low energy pulse is injected into the inductor circuit to slightly accelerate the rotor 3. The low energy pulse in this example corresponds to a low voltage value (e.g. 0.4 V, which is slightly above the maximum of the sum of the two induced voltages in the two coils) being applied across the inductor circuit for a fifth time duration, which in this example is between 3 ms and 7 ms. The sequence is terminated and the process then continues in step 105.

If in step 137 it was determined that the condition is not fulfilled, i.e. dt_Peak≤dt_T1, then in step 141 dt_Peak is compared to a third speed threshold T3, which in this example is a fixed threshold. However, instead of being a fixed threshold, the third speed threshold could also be a variable threshold depending on the current value Cv of the counter C. The third speed threshold is set to be smaller than the first speed threshold in all situations determined by steps 121, 125, 129 and 131. In this specific example T3 is set to 14 ms. In step 141, it is thus determined whether or not the following condition is fulfilled: dt_Peak>T3 In the affirmative, this means that the rotational speed of the rotor is in a third range. In this case, no drive action is taken regarding the driving of the rotor 3 and the process then starts a new sequence in step 105. However, if in step 141 it was determined that the condition is not fulfilled, i.e. dt_Peak≤T3 (this means that the rotational speed is in a fourth range and the rotor spins clearly too fast), then in step 143 the inductor circuit is short-circuited as in step 113. This slows down the rotor 3. After step 143, the sequence is terminated and the process again continues in step 105.

It is to be noted that when generating the energy (voltage) pulses, advantageously these pulses are generated shortly (e.g. within 1 ms) after the crossing of the induced voltage pulses has been detected in order to avoid decentring the drive pulses with respect to the maximum of the sum of the induced voltages (total induced voltage). In other words, the drive pulses are ideally generated as close as possible to the peak of the sum of the two induced voltages. Furthermore, the above example can be generalised by having a number of N different speed thresholds defining N+1 rotor rotational speed ranges (via the corresponding selected time parameter). At least one of the speed thresholds may be a fixed threshold, while the other speed thresholds may be variable thresholds depending on the value Cv of the counter C. The control method comprises the selection of an action among a group of different defined actions relative to the control of an electrical current through the inductor circuit, based on the determined rotor rotational speed range, to control the rotational speed of the rotor. It is further to be noted that the order of executing some of the steps of the flow chart of FIG. 3 may be interchanged.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:
1. A control method of a direct current electric motor (1) comprising a rotor (3) and an inductor circuit (A, B) for driving the rotor, which is configured to rotate continuously and is equipped with permanent magnets, the method comprising the following steps:
   from a start time point, measuring (101, 111, 115) a time drift (Cv) in the rotor rotation by comparing a detected number of rotation cycles of the rotor with a reference number of nominal rotation cycles for the rotor corresponding to a nominal rotational speed, the nominal rotation cycles being determined by a reference clock signal;
   defining (121, 125, 129, 131, 141) N speed threshold(s) with N being greater than zero, at least one of the speed threshold(s) being a variable speed threshold (dt_T1, dt_T2) depending on the measured time drift in the rotor rotation, the N speed threshold(s) defining N+1 rotational speed ranges for the rotor;
the method further comprising a periodic sequence of the following steps;
   measuring (105) a time parameter (dt_Peak) of the direct current electric motor, the value of which is determined by the rotational speed of the rotor;

adjusting the at least one variable speed threshold in function of the current value of the time drift;

based on the measured time parameter, determining (133, 137, 141) in which one of the N+1 rotational speed ranges the rotational speed of the rotor is; and selecting (135, 139, 143) an action among a group of different defined actions relative to the control of an electrical current through the inductor circuit, based on the determined rotational speed range in the preceding step, to control the rotational speed of the rotor.

2. The control method according to claim 1, with N being greater than one; wherein at least one of the N speed thresholds is a fixed threshold.

3. The control method according to claim 1, wherein the inductor circuit (A, B) comprises a first inductor (A) and a second inductor (B), the rotation of the rotor (3) inducing a first induced voltage across the first inductor (A) and a second induced voltage across the second inductor (B); and wherein the time parameter is a time difference between two consecutive crossings of the first and second induced voltages.

4. The control method according to claim 1, wherein the group of different defined actions comprises the following actions: applying one or more energy pulses across at least a portion of the inductor circuit; no drive action; and short-circuiting at least a portion of the inductor circuit.

5. The control method according to claim 4, wherein the group of different defined actions comprises a first action in which a first voltage pulse, with a first voltage level and a first duration, is applied and a second action in which a second voltage pulse, with a second voltage level and a second duration, is applied; and wherein the second voltage level is lower than the first voltage level.

6. The control method according to claim 5, wherein the second duration is shorter than the first duration.

7. The control method according to claim 1, wherein there are a plurality of variable speed thresholds; and wherein, if the time drift in the rotor rotation is determined to correspond to substantially zero or to a given small time advance, the variable speed thresholds are selected such as to allow substantially maintaining the current rotational speed of the rotor.

8. The control method according to claim 7, wherein, if the time drift in the rotor rotation is determined to correspond to at least a given time advance, the variable speed thresholds are selected such as to allow slowing down the rotational speed of the rotor.

9. The control method according to claim 7, wherein, if the time drift in the rotor rotation is determined to correspond to at least a given time delay, the variable speed thresholds are selected such as to allow accelerating the rotational speed of the rotor.

10. The control method according to claim 1, wherein the direct current electric motor (1) is of the horological type and intended to be incorporated, with its control unit implementing the method, in an electromechanical watch movement.

* * * * *